United States Patent [19]

Mori

[11] Patent Number: 4,643,524
[45] Date of Patent: Feb. 17, 1987

[54] METHOD OF USING A CONDENSING LENS

[76] Inventor: Kei Mori, 3-16-3-501, Kaminoge, Setagaya-ku, Tokyo, Japan

[21] Appl. No.: 579,840

[22] Filed: Feb. 13, 1984

[30] Foreign Application Priority Data

Feb. 14, 1983 [JP] Japan .................................. 58-22573
Feb. 23, 1983 [JP] Japan .................................. 58-28911

[51] Int. Cl.⁴ ................................................. G02B 5/22
[52] U.S. Cl. ..................................... 350/320; 350/1.1; 350/438
[58] Field of Search ................... 350/1.1, 1.2, 1.6, 1.7, 350/448, 438, 165, 312, 320

[56] References Cited

U.S. PATENT DOCUMENTS 2,520,635  8/1950  Grey ...................................... 350/1.2
3,118,063  1/1964  Kaufman .............................. 350/1.1
3,481,758  12/1969  Upton .................................. 350/1.1
4,196,967  4/1980  Ohnishi et al. ...................... 350/448
4,483,585  11/1984  Takami ............................... 350/96.18

Primary Examiner—Bruce Y. Arnold
Attorney, Agent, or Firm—Jordan and Hamburg

[57] ABSTRACT

A method of using a condensing lens which carries an optical filter in a central portion thereof which includes an optical axis. The filter intercepts ultraviolet rays and infrared rays except for those which are incident on an exposed peripheral portion of the lens. The filtered light is conducted by a light conducting cable to a plant culturing station for photosynthesis. The light receiving end of the cable is usually located at the focal point of visible rays output from the lens and, at the time of harvest, at the focal point of ultraviolet rays.

12 Claims, 6 Drawing Figures

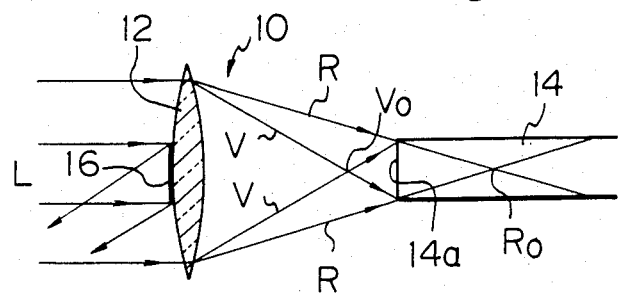
Fig. 1
Fig. 2
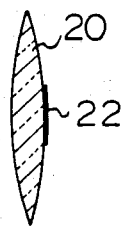
Fig. 3
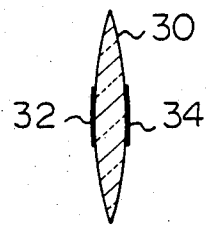
Fig. 4
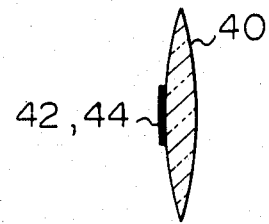
Fig. 5
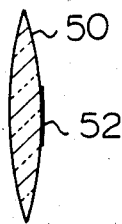
Fig. 6
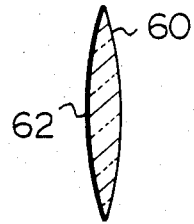

METHOD OF USING A CONDENSING LENS

BACKGROUND OF THE INVENTION

The present invention relates to a condensing lens which condenses light components having desired wavelengths by reflecting and/or absorbing the other wavelengths components.

There has been proposed a system in which the sunlight is converged by a lens into a light conducting member to propagate therethrough to a desired location for lighting and other applications. For example, the converged light is usable for photosynthesis, that is, cultivation of chlorella or forcing culture of plants. In such an application, infrared rays and ultraviolet rays (and X-rays) contained in the solar energy are harmful for photosynthetic reactions. While the harmful light components may be removed by installing an optical filter in an optical path of the system, the filter renders the optical path intricate in structure and, because an optical filter capable of cutting both the infrared rays and the ultraviolet rays is unavailable at the present stage of development, two different kinds of filters are required which add to the intricacy of the optical path structure. Meanwhile, should an optical filter be located ahead or just past the lens with respect to the direction of light propagation, it would require an area identical with the area of the lens and, therefore, result in a bulky configuration. On the other hand, should the optical filter be positioned in the vicinity of the focal point of the lens, the filter would be damaged by the heat of the condensed light or a desired light component would be reflected by the filter to increase the loss, although the dimensions of the lens would be trimmed.

Meanwhile, it has recently been found that applying ultraviolet rays to plants which are ready for harvest promotes secretion of hormones of the plants, or maturing of the plants, thereby increasing the sweetness or giving better smell and/or color. Therefore, a light source apparatus is desired which, despite the use of an optical filter which usually cuts ultraviolet and infrared rays, allows ultraviolet rays to be supplied to plants only in the above-mentioned specific stage of cultivation.

SUMMARY OF THE INVENTION

It is an object of the present invention to provide a light source apparatus which allows ultraviolet rays converged by a condensing lens to selectively reach a desired location.

In accordance with one aspect of the present invention, there is provided a method of using a condensing lens comprising a lens body having a light input surface and a light output surface, and an optical filter fit on at least part of the surfaces of the lens body which includes an optical axis of the lens body.

In another aspect of the present invention, there is provided a methof of using a light source apparatus for culturing plants, said apparatus comprising a condensing lens comprising a lens body having a light input surface and a light output surface, and an optical filter fit on at least part of the surfaces of the lens body which includes an optical axis of the lens body, the optical filter intercepting ultraviolet rays and infrared rays, and a light conducting cable having a light receiving end which is positioned on an optical axis of the condensing lens, the light receiving end being movable between a focal point of visible rays transmitted through the lens body and a focal point of ultraviolet rays transmitted through the lens body, whereby ultraviolet rays are routed to the plants by the light conducting cable when the plants are ready for harvest.

A condensing lens carries an optical filter in a central portion thereof which includes an optical axis. The filter intercepts ultraviolet rays and infrared rays except for those which are incident on an exposed peripheral portion of the lens. The filtered light is conducted by a light conducting cable to a plant cultivating station for photosynthesis. The light receiving end of the cable is usually located at the focal point of visible rays output from the lens and, at the time of harvest, at the focal point of ultraviolet rays. The lens may be entirely covered with the filter.

The above and other objects, features and advantages of the present invention will become more apparent from the following detailed description taken with the accompanying drawing.

BRIEF DESCRIPTION OF THE DRAWING

FIGS. 1-6 are sections of various embodiments of a condensing lens in accordance with the present invention.

DESCRIPTION OF THE PREFERRED EMBODIMENTS

While the condensing lens of the present invention is susceptible of numerous physical embodiments, depending upon the environment and requirements of use, substantial numbers of the herein shown and described embodiments have been made, tested and used, and all have performed in an eminently satisfactory manner.

Referring to FIG. 1 of the drawing, a condensing lens embodying the present invention is shown and generally designated by the reference numeral 10. The lens 10 comprises a lens body 12. The sunlight, or optical energy, L is incident on the condensing lens 10 and converged thereby into a light conducting member 14, which is located on an optical axis of the lens 10. The lens body 12 may be made of any desired material (quartz, glass, acrylic resin, etc.) or provided with any desired configuration (Fresnel lens, single lens, etc.).

An optical filter member 16 is fit on a radially central area of the lens body 12 which includes the optical axis. The filter member 16 comprises a thin layer of gold which is deposited on the lens body 12 by evaporation. Therefore, the filter member 16 is reflective for infrared rays and ultraviolet rays (and X-rays) while being transmissive for visible rays. That is, infrared rays and ultraviolet rays in the sunlight L are reflected by the filter member 16 before reaching the light conductor 14, except for the peripheral exposed portion of the lens body 12.

In detail, the optical energy L containing infrared rays and ultraviolet rays and converged by the peripheral portion of the condensing lens 10 into the light conductor 14. The infrared rays R focusses to a point $R_0$, and the ultraviolet rays V to a point $V_0$. Because the diameter of the light conductor 14 and the position of a light receiving end 14a of the light conductor 14 on the optical axis are so selextable as to prevent the converged infrared and ultraviolet rays from reaching the interior of the light conductor 14, it is possible to introduce only the visible rays into the light conductor 14.

While the condensing lens of the present invention has been shown and described in conjunction with the sunlight, it is similarly applicable to any desired artificial light source. For example, when applied to a xenon lamp or like artificial light source which contains substantial quantities of infrared and ultraviolet rays, the condensing lens 10 will remove the infrared and ultraviolet rays before the light reaches the light conductor. The condenser lens may even be used to cut infrared rays and/or ultraviolet rays contained in light which is emitted from a light source other than those mentioned above.

Referring to FIGS. 2–5, other various embodiments of the present invention are shown. In FIG. 2, an optical filter member 22 is carried on the other or light output surface of the lens body 20. Again, the filter 22 consists of a thin layer of gold deposited on the lens body 20 by evaporation. The lens body 20 may comprise a Fresnel lens. In FIG. 3, a lens body 30 carries thereon a first filter member 32 which is absorptive for infrared rays and a second filter member 34 which is absorptive for ultraviolet rays. The two filter members 32 and 34 are respectively positioned on opposite sides of the lens body 30. In FIG. 4, there is shown a condensing lens which has a first filter member 42 absorptive for infrared rays and a second filter member 44 absorptive for ultra-violet rays, the filter members 42 and 44 being laid one upon the other in a central portion of the lens body 40. Further, in FIG. 5, a lens body 50 comprises an infrared rays absorptive filter lens, while a filter member 52 absorptive for ultraviolet rays is deposited on a central portion of one of the opposite surfaces of the lens body 50.

Referring to FIG. 6, still another embodiment of the present invention is shown. This embodiment is distinguishable from the foregoing ones in that a lens body 60 has its one surface entirely covered with a filter member 62. The lens configuration shown in FIG. 6 will further facilitate focusing of the lens and positively remove undesired light rays, compared to the partly covered lens configuration.

It will be seen from the above that a condensing lens of the present invention effectively intercepts light components having undesired wavelengths by means of a simple and economical configuration. The reflection type filter members such as shown in FIGS. 1 and 2 will less suffer from thermal deterioration due to infrared and ultraviolet rays than the absorption type filter members such as shown in FIGS. 3–5 and, for this reason, they are desirably applicable to an optical path along which optical energy having a high energy density propagates.

Now, a typical application of the present invention will be described which may employ any one of the condensing lenses shown in FIGS. 1–5. While the application will be discussed with reference to the construction and arrangement shown in FIG. 1, the lens configuration of FIG. 1 should not be considered essential in this case and may be replaced with any one of those shown in FIGS. 2–5.

In FIG. 1, the light conductor 14 terminates at a plant cultivation chamber (not shown) at its end which is opposite to the light receiving end 14a. An arrangement is made such that the light receiving end 14a of the light conductor is movable on the optical axis of the lens 10 toward and away from the focal point $V_0$ of ultraviolet rays, which has been previously described.

Usually, the light conductor 14 is located such that the infrared and ultraviolet rays condensed by the peripheral portion of the lens body 12 are prevented from reaching the light receiving end 14a of the light conductor 14. Under this condition, the visible rays allowed to propagate through the light conductor 14 are used for effective photosynthesis of plants in the cultivation chamber. At the time of harvest, on the other hand, the light conductor 14 is moved to have its light receiving end 14a aligned with the focal point $V_0$ of ultraviolet rays. In such a position, the light conductor 14 transmits the ultraviolet rays to the plant cultivation chamber. When ultraviolet rays are applied to plants which have been matured enough for harvest, they promote secretion of dead hormone of the plants to sweeten the plants (e.g. fruit), give better smell to the plants (e.g. laver), or give better color (e.g. tomato and persimmon).

Various modifications will become possible for those skilled in the art after receiving the teachings of the present disclosure without departing from the scope thereof.

What is claimed is:

1. A method of utilizing converged light comprising the steps of disposing optical filter means on a part of a condensing lens which intersects the optical axis of the lens. leaving a peripheral exposed portion on said lens on which said filter means is not disposed, positioning a light receiving end of a conducting cable at the focal point of visible rays, utilizing said filter means for intercepting ultraviolet rays or infrared rays while transmitting visible rays through said lens to said cable, moving said light receiving end to the selected focal point of either said ultraviolet rays or said infrared rays, and transmitting either said ultravilet rays or said infrared rays through said peripheral exposed portion of said lens depending on said selected focal point.

2. A method as claimed in claim 1, in which the lens body comprises a Fresnel lens.

3. A method as claimed in claim 1, in which said optical filter means is made of a reflection type filter member.

4. A method as claimed in claim 3 further comprising depositing by evaporation a thin layer of gold which is reflective of ultraviolet rays and infrared rays on the lens to thereby form said filter member.

5. A method as claimed in claim 1, in which said optical filter means is made of an absorption type filter member.

6. A method as claimed in claim 5, in which said optical filter means comprises a first filter member absorptive of ultraviolet rays and a second filter member absorptive of infrared rays.

7. A method as claimed in claim 6 further comprising disposing the first filter member on one of the light input and light output surfaces of the lens and disposing the second filter member on the other surface.

8. A method as claimed in claim 6 further comprising disposing the first and second filter members adjacent to to one another on one of the light input and light output surfaces of the lens.

9. A method as claimed in claim 5, in which said lens comprises an infrared rays absorptive filter lens, said filter means comprising a filter member absorptive of ultraviolet rays.

10. A method as claimed in claim 1 further comprising disposing said optical filter means on the light input surface of the lens.

11. A method as claimed in claim 1 further comprising disposing said optical filter means on the light output surface of the lens.

12. A method of utilizing converged light for photosynthesis comprising the steps of disposing optical filter means on a part of a condensing lens which intersects the optical axis of the lens, leaving a peripheral exposed portion on said lens on which said filter means is not disposed, positioning a light receiving end of a light conducting cable at the focal point of visible rays, utilizing said filter means for intercepting ultraviolet ray or infrared rays while transmitting visible rays through said lens to said cable, utilizing said visible rays transmitted to said cable for effecting photosynthesis of plants, moving said light receiving end to the focal point of ultraviolet rays, transmitting ultraviolet rays through said peripheral exposed portion of said lens to said cable, and utilizing said transmitted ultraviolet rays on mature plants which have reached maturity utilizing said transmitted visible rays to enhance the quality of said mature plants such as enhancing sweetness, smell and color.

* * * * *